United States Patent
Guan et al.

(10) Patent No.: US 10,870,943 B2
(45) Date of Patent: Dec. 22, 2020

(54) SMART CLOTHES DRYING DEVICE AND SMART CLOTHES DRYING METHOD

(71) Applicant: BOE TECHNOLOGY GROUP CO., LTD., Beijing (CN)

(72) Inventors: Enhui Guan, Beijing (CN); Xueyun Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 139 days.

(21) Appl. No.: 16/168,929

(22) Filed: Oct. 24, 2018

(65) Prior Publication Data

US 2019/0203407 A1    Jul. 4, 2019

(30) Foreign Application Priority Data

Jan. 3, 2018 (CN) .......................... 2018 1 0004165

(51) Int. Cl.
*F26B 19/00* (2006.01)
*D06F 58/10* (2006.01)
(Continued)

(52) U.S. Cl.
CPC ............ *D06F 58/10* (2013.01); *A47G 25/14* (2013.01); *D06F 58/30* (2020.02); *F26B 3/286* (2013.01);
(Continued)

(58) Field of Classification Search
CPC .. A47G 25/14; A47G 2200/066; D06F 58/10; D06F 58/30; D06F 2103/38;
(Continued)

(56) References Cited

U.S. PATENT DOCUMENTS 5,566,471 A * 10/1996 Hirano .................... D06F 57/00
    34/201
2017/0350067 A1* 12/2017 Choi ....................... D06F 58/30

FOREIGN PATENT DOCUMENTS

CN        1081255 C     3/2002
CN      202298243 U     7/2012
(Continued)

OTHER PUBLICATIONS

First Office Action for Chinese Application No. 201810004165.4, dated Jun. 19, 2020, 20 Pages.

*Primary Examiner* — John P McCormack
(74) *Attorney, Agent, or Firm* — Brooks Kushman P.C.

(57) ABSTRACT

The present disclosure provides a smart clothes drying device and a smart clothes drying method. The smart clothes drying device includes a light intensity sensor, an integrated controller, an umbrella and at least one clothes hanger. The light intensity sensor is to sense light intensity and output a light intensity signal. The integrated controller is to receive the light intensity signal and control opening or closing of the umbrella according to a comparison result of comparing the light intensity signal with a closing light intensity threshold or an opening light intensity threshold in such a manner that the integrated controller controls opening the umbrella when the light intensity signal is greater than the opening light intensity threshold, and the integrated controller controls closing the umbrella when the light intensity signal is less than the closing light intensity threshold.

13 Claims, 4 Drawing Sheets

(51) Int. Cl.
*F26B 25/06* (2006.01)
*A47G 25/14* (2006.01)
*F26B 9/06* (2006.01)
*F26B 9/10* (2006.01)
*F26B 25/00* (2006.01)
*F26B 25/22* (2006.01)
*F26B 3/28* (2006.01)
*D06F 58/30* (2020.01)
*D06F 58/38* (2020.01)
*D06F 103/38* (2020.01)

(52) U.S. Cl.
CPC ............... *F26B 9/063* (2013.01); *F26B 9/10* (2013.01); *F26B 25/003* (2013.01); *F26B 25/066* (2013.01); *F26B 25/22* (2013.01); *A47G 2200/066* (2013.01); *D06F 58/38* (2020.02); *D06F 2103/38* (2020.02)

(58) Field of Classification Search
CPC ...... D06F 2103/00; D06F 60/00; D06F 59/00; D06F 34/28; D06F 57/00; F26B 9/10; F26B 9/063; F26B 25/003; F26B 25/22; F26B 25/066; F26B 3/286; G05B 15/02; G05B 19/418; G05B 2219/2642
USPC .................................. 34/93, 522, 511, 512
See application file for complete search history.

(56) References Cited

FOREIGN PATENT DOCUMENTS

| | | | |
|---|---|---|---|
| CN | 103321025 A | | 9/2013 |
| CN | 203257290 U | | 10/2013 |
| CN | 204608467 U | * | 9/2015 |
| CN | 204919128 U | | 12/2015 |
| CN | 205258919 U | | 5/2016 |
| CN | 106012447 A | | 10/2016 |
| CN | 106477117 A | | 3/2017 |
| CN | 206239053 U | | 6/2017 |
| CN | 107299501 A | | 10/2017 |
| CN | 107476016 A | | 12/2017 |
| JP | H08894 A | | 1/1996 |

* cited by examiner

SMART CLOTHES DRYING DEVICE AND SMART CLOTHES DRYING METHOD

CROSS-REFERENCE TO RELATED APPLICATION

This application claims priority to Chinese Patent Application No. 201810004165.4, filed on Jan. 3, 2018, which is incorporated herein by reference in its entirety.

TECHNICAL FIELD

The present disclosure relates to the field of smart home technology, and in particular to a smart clothes drying device and a smart clothes drying method.

BACKGROUND

With the improvement of living standards, smart home devices are more and more popular. The smart home devices have gradually entered every household, and bring great convenience to users.

Currently, one user usually puts washed clothes on a drying rack on a balcony or at other places for drying. However, the drying rack has a single function of drying clothes.

SUMMARY

One embodiment of the present disclosure provides a smart clothes drying device which includes a light intensity sensor, an integrated controller, an umbrella and at least one clothes hanger. The light intensity sensor is configured to sense light intensity and output a light intensity signal. The integrated controller is configured to receive the light intensity signal and control opening or closing of the umbrella according to a comparison result of comparing the light intensity signal with a closing light intensity threshold or an opening light intensity threshold in such a manner that the integrated controller controls opening the umbrella when the light intensity signal is greater than the opening light intensity threshold, and the integrated controller controls closing the umbrella when the light intensity signal is less than the closing light intensity threshold.

Optionally, the smart clothes drying device further includes a rain-and-snow sensor. The rain-and-snow sensor is configured to sense rain-and-snow information and output a rain-and-snow signal. The integrated controller is configured to receive the rain-and-snow signal, and determine whether there is rain or snow according to the rain-and-snow information reflected by the rain-and-snow signal. The integrated controller is further configured to control opening the umbrella when there is rain or snow, and control closing the umbrella when there is no rain or snow.

Optionally, the smart clothes drying device further includes a prompter and a humidity sensor for contacting a bottom portion of clothes on the clothes hanger. The humidity sensor is configured to sense humidity information of the clothes and output a humidity signal. The integrated controller is configured to receive the humidity signal, and compare the humidity information reflected by the humidity signal with a drying threshold; and control the prompter to send a prompt message when the humidity information reflected by the humidity signal output by the humidity sensor is less than the drying threshold.

Optionally, the smart clothes drying device further includes a remote communication circuit. The prompter is configured to send a remote prompt message through the remote communication circuit.

Optionally, the smart clothes drying device further includes a first movement mechanism and a storage box under the clothes hanger. The clothes hanger is mounted to the first movement mechanism; an opening is defined in a top portion of the storage box, and a cover is disposed at the opening. When the humidity information reflected by the humidity signal output by the humidity sensor is less than the drying threshold, the integrated controller is configured to, control the cover to be opened and control the first movement mechanism to drive the clothes hanger to move downward; control the first movement mechanism to drop the clothes hanger after the clothes hanger enters into the opening; control the cover to be closed after the first movement mechanism drops each clothes hanger.

Optionally, the first movement mechanism includes two vertical supporters, a horizontal supporter, and a plurality of spaced vertical telescopic poles; the two vertical supporters are disposed at two ends of the storage box; two ends of the horizontal supporter are in sliding connection with the two vertical supporters, respectively; an upper end of each vertical telescopic pole is hung on the horizontal supporter; a lower end of each vertical telescopic pole is used to mount the clothes hanger; and the humidity sensor is hung on the horizontal supporter.

Optionally, the humidity sensor is hung on the horizontal supporter through a rope.

Optionally, the smart clothes drying device further includes a second movement mechanism in the storage box, a clamp mounted to the second movement mechanism and a distance sensor. The clamp and the distance sensor are in the storage box. The distance sensor is configured to detect a distance between one side of the storage box where the distance sensor is located and another side of the storage box opposite to the one side of the storage box where the distance sensor is located, and output a distance signal. When the humidity information reflected by the humidity signal output by the humidity sensor is less than the drying threshold, the integrated controller is configured to control opening the cover and control the first movement mechanism to drive the clothes hanger to move to the another side of the storage box opposite to the one side of the storage box where the distance sensor is located, and then move downward; meanwhile, the integrated controller is configured to determine whether a distance sensed by the distance sensor is varied from an initial distance between the distance sensor and the another side of the storage box opposite to the one side of the storage box where the distance sensor is located. When the distance sensed by the distance sensor is varied, the integrated controller is configured to control the first movement mechanism to stop driving the clothes hanger to move downwards; meanwhile, the integrated controller is configured to control the second movement mechanism to drive the clamp to move to the another side of the storage box opposite to the one side of the storage box where the distance sensor is located, and control the clamp to grip the clothes on the clothes hanger. After the clamp grips the clothes on the clothes hanger, the integrated controller is configured to control the first movement mechanism to continue driving the clothes hanger to move downward while controlling the second movement mechanism to drive the clamp to move backward; when the clamp moves back to an initial position of the clamp or the clothes hanger enters into the opening, the integrated controller is configured to control the first movement mechanism to drop the clothes hanger and control the clamp to drop the clothes on the clothes hanger. After the clamp drops the clothes on the clothes hanger, the integrated controller is configured to control the second movement mechanism to drive the clamp and the distance sensor to move upwardly at the same time until the distance reflected by the distance signal is restored to the initial distance between the distance sensor and the another side of the storage box opposite to the one side of the storage box where the distance sensor is located. After the first movement mechanism drops the clothes hanger, the integrated controller is configured to control the cover to be closed.

Optionally, a movement speed of the clothes hanger when the integrated controller controls the first movement mechanism to continue driving the clothes hanger to move downward, is equal to a movement speed of the clamp when the integrated controller controls the second movement mechanism to drive the clamp to move backward.

Optionally, the second movement mechanism includes two spaced vertical rails on each of a first side and an opposite second side of the storage box, a horizontal rail on each of the first side and the second side, and a sliding portion. On each of the first side and the second side, the horizontal rail is slidably mounted on the two spaced vertical rails, and is movable relative to the two spaced vertical rails in a vertical direction; two ends of the sliding portion are slidably mounted at the horizontal rail on each of the first side and the second side, respectively; the sliding portion is movable along the horizontal rails in a horizontal direction; the clamp is mounted on the sliding portion; and the distance sensor is mounted on the horizontal rail on one of the first side and the second side.

Optionally, the first movement mechanism includes two vertical supporters, a horizontal supporter, and a plurality of spaced vertical telescopic poles; the two vertical supporters are disposed at two ends of the storage box; two ends of the horizontal supporter are in sliding connection with the two vertical supporters, respectively; an upper end of each vertical telescopic pole is hung on the horizontal supporter; a lower end of each vertical telescopic pole is used to mount the clothes hanger; and the humidity sensor is hung on the horizontal supporter.

Optionally, the humidity sensor is hung on the horizontal supporter through a rope.

Optionally, the umbrella is mounted to the storage box.

Optionally, the smart clothes drying device further includes a timing device mounted to the clothes hanger.

Optionally, the clothes hanger includes an upper arm for carry the clothes, and the timing device is mounted at the upper arm.

One embodiment of the present disclosure further provides a smart clothes drying method based on the above smart clothes drying device. The method includes: using the light intensity sensor to sense light intensity and output a light intensity signal; using the integrated controller to control opening or closing of the umbrella according to a comparison result of comparing the light intensity signal with a closing light intensity threshold or an opening light intensity threshold in such a manner that the integrated controller controls opening the umbrella when the light intensity signal is greater than the opening light intensity threshold, and the integrated controller controls closing the umbrella when the light intensity signal is less than the closing light intensity threshold.

Optionally, the method further includes: providing a prompter and a humidity sensor in contact with a bottom portion of clothes on the clothes hanger; using the humidity sensor to sense humidity information of the clothes and output a humidity signal; using the integrated controller to compare the humidity information reflected by the humidity signal with a drying threshold; controlling the prompter to send a prompt message when the humidity information reflected by the humidity signal output by the humidity sensor is less than the drying threshold.

Optionally, the method further includes: installing a first movement mechanism with the clothes hanger and placing a storage box under the clothes hanger; using the integrated controller to control a cover of the storage box to be opened and control the first movement mechanism to drive the clothes hanger to move downward when the humidity information reflected by the humidity signal output by the humidity sensor is less than the drying threshold; using the integrated controller to control the first movement mechanism to drop the clothes hanger after the clothes hanger enters into an opening of the storage box; using the integrated controller to control the cover to be closed after the first movement mechanism drops the clothes hanger.

Optionally, the method further includes: installing the first movement mechanism with the clothes hanger, placing a storage box under the clothes hanger, placing a second movement mechanism in one side of the storage box, and mounting a clamp and a distance sensor on the second movement mechanism with the clamp and the distance sensor within the storage box; using the distance sensor to detect a distance between one side of the storage box where the distance sensor is located and another side of the storage box opposite to the one side of the storage box where the distance sensor is located, and output a distance signal; when the humidity information reflected by the humidity signal output by the humidity sensor is less than the drying threshold, using the integrated controller to control opening the cover and control the first movement mechanism to drive the clothes hanger to move to the another side of the storage box opposite to the one side of the storage box where the distance sensor is located, and then move downward; and using the integrated controller to determine whether a distance sensed by the distance sensor is varied from an initial distance between the distance sensor and the another side of the storage box opposite to the one side of the storage box where the distance sensor is located; when the distance sensed by the distance sensor is varied, using the integrated controller to control the first movement mechanism to stop driving the clothes hanger to move downwards; meanwhile, using the integrated controller to control the second movement mechanism to drive the clamp to move to the another side of the storage box opposite to the one side of the storage box where the distance sensor is located, and control the clamp to grip the clothes on the clothes hanger; after the clamp grips the clothes on the clothes hanger, using the integrated controller to control the first movement mechanism to continue driving the clothes hanger to move downward while controlling the second movement mechanism to drive the clamp to move backward; when the clamp moves back to an initial position of the clamp or the clothes hanger enters into the opening, using the integrated controller to control the first movement mechanism to drop the clothes hanger and control the clamp to drop the clothes on the clothes hanger; after the clamp drops the clothes on the clothes hanger, using the integrated controller to control the second movement mechanism to drive the clamp and the distance sensor to move upwardly at the same time until the distance reflected by the distance signal is restored to the initial distance between the distance sensor and the another side of the storage box opposite to the one side of the storage box where the distance sensor is located; after the first movement mechanism drops the clothes hanger, using the integrated controller to control the cover to be closed.

BRIEF DESCRIPTION OF THE DRAWINGS

A brief introduction will be given hereinafter to the accompanying drawings which will be used in the description of the embodiments in order to explain the embodiments of the present disclosure more clearly. Apparently, the drawings in the description below are merely for illustrating some embodiments of the present disclosure. Those skilled in the art may obtain other drawings according to these drawings without paying any creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Currently, one user usually puts washed clothes on a drying rack on a balcony or at other places for drying. However, the drying rack has a single function of drying clothes. Further, as the weather changes, on one hand, when the clothes are exposed to strong sunlight for a long time, internal materials of the clothes may deteriorate and be damaged or discolored; on the other hand, when there is rain or snow, the clothes will be wet.

In addition to the above problems, with the fast life rhythm, more and more users may forget to collect clothes that are drying due to work or other reasons or the users go out and cannot collect the clothes that are drying. Then, the clothes put on the drying rack on the balcony or at other places may be exposed to the external environment for a long time, and may be dirty again due to dust accumulation. Thus, it is necessary to provide a smart clothes drying device and a smart clothes drying method.

Figure 1:
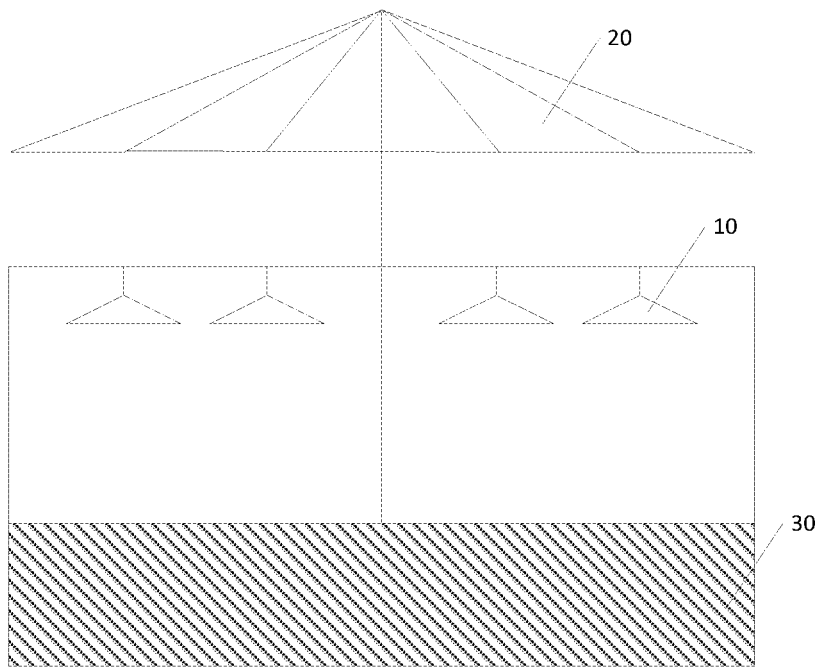
FIG. 1 is a schematic view of a smart clothes drying device according to an embodiment of the present disclosure.

FIG. 1 is a schematic view of a smart clothes drying device according to an embodiment of the present disclosure. As shown in FIG. 1, the smart clothes drying device includes a light intensity sensor 40, an integrated controller, an umbrella 20 and at least one clothes hanger 10. When the umbrella 20 is open, the umbrella 20 is capable of shielding each clothes hanger 10.

Figure 5:
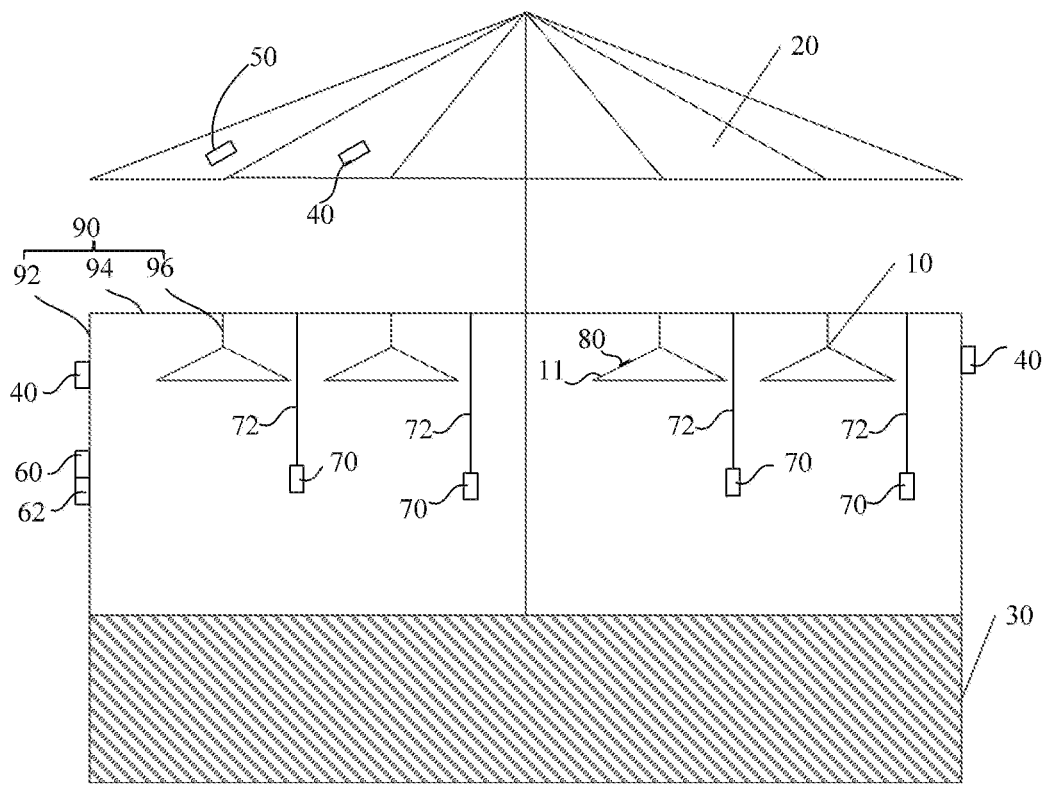
FIG. 5 is a schematic view of a smart clothes drying device according to an embodiment of the present disclosure.

Specifically, the light intensity sensor may be mounted to positions which are not shielded by the umbrella 20 in an opening state. For example, as shown in FIG. 5, two light intensity sensors 40 may be mounted to ends of the smart clothes drying device, or one light intensity sensor 40 may be mounted to a top surface of the umbrella 20.

The light intensity sensor senses the light intensity and outputs a light intensity signal. In one embodiment, the light intensity sensor senses the light intensity of natural environment, and the light intensity of natural environment may represent light intensity of light irradiated to the clothes hanger 10 and light intensity of light irradiated to clothes mounted on the clothes hanger 10.

The integrated controller receives the light intensity signal output from the light intensity sensor, and controls opening or closing of the umbrella 20 according to a comparison result of comparing the light intensity signal with a closing light intensity threshold or an opening light intensity threshold.

For example, when the light intensity signal is greater than the opening light intensity threshold, the integrated controller controls opening the umbrella 20. When the light intensity signal is greater than the opening light intensity threshold, it indicates that the light intensity of sunlight is high. At this time, the umbrella 20 is opened to shield clothes on all clothes hangers 10, thereby preventing the clothes from being damaged by strong sunlight.

When the light intensity signal is less than the closing light intensity threshold, the integrated controller controls closing the umbrella 20. When the light intensity signal is less than the opening light intensity threshold, it indicates that the light intensity of sunlight is weak. At this time, sunlight does not damage the clothes on the clothes hangers 10, and the umbrella 20 can be closed.

When the light intensity signal is greater than or equal to the closing light intensity threshold and less than the opening light intensity threshold, i.e., the light intensity signal is between the closing light intensity threshold and the opening light intensity threshold, it indicates that the light intensity of the sunlight is at a critical value, and the integrated controller does not adjust the opening or closing state of the umbrella 20.

The closing light intensity threshold is less than the opening light intensity threshold, specific values of the closing light intensity threshold and the opening light intensity threshold may be set according to experience and experiments. For example, specific values of the closing light intensity threshold and the opening light intensity threshold may be obtained by carrying an experiment based on relationship of light intensities irradiated to clothes and damage of the clothes.

In actual application, as shown in FIG. 5, the smart clothes drying device further includes a rain-and-snow sensor 50. The rain-and-snow sensor 50 is used to sense rain-and-snow information and output a rain-and-snow signal.

The integrated controller receives the rain-and-snow signal, and determines whether there is rain or snow according to the rain-and-snow information reflected by the rain-and-snow signal. When there is rain or snow, the integrated controller controls opening the umbrella 20. When there is no rain or snow, the integrated controller controls closing the umbrella 20.

In this way, when preventing the clothes from being damaged by the strong sunlight, the smart clothes drying device can automatically open the umbrella 20 when there is rain or snow, thereby preventing the clothes on the clothes hanger 10 from getting wet.

In actual application, when the umbrella 20 is used for shading and blocking the rain and snow, the umbrella 20 may be an all-weather umbrella.

In actual application, the smart clothes drying device further includes a prompter 60 and a humidity sensor 70 used for contacting bottom portions of clothes on the clothes hanger 10.

The humidity sensor 70 is used to sense humidity information of the clothes and output a humidity signal.

The integrated controller receives the humidity signal, and compares the humidity information reflected by the humidity signal with a drying threshold. When the humidity information reflected by the humidity signal output by each humidity sensor is less than the drying threshold, the integrated controller controls the prompter to send a prompt message. The specific value of the drying threshold may be set according to experience and experiments.

In one embodiment, the humidity sensor 70 may be hung on or wound around the clothes hanger 10 or other position (such as a first movement mechanism which is described hereinafter) of the smart clothes drying device through a rope. When used, the humidity sensor 70 drops naturally under the force of gravity and is in contact with bottom portions of the clothes on the clothes hanger 10. The prompter 60 may be a device that can produce sounds or messages such as words, such as a loudspeaker, a monitor, a transmitter that can send messages.

In normal process of drying clothes, the bottom portions of the clothes are usually final drying portions, thus, the humidity sensor is provided at the bottom portions of the clothes and in contact with the clothes, so as to detect whether the clothes are dry. After the integrated controller determines that the clothes are dry, the integrated controller controls the prompter to send a prompt message for reminding the user to collect the clothes as soon as possible, thereby preventing the clothes that are drying from being dirty again due to dust accumulation when the user forgets to collect the clothes that are drying.

In actual implementation, in order to save power, calculate resources and extend working life of the humidity sensor and the integrated controller, a timing device 80 may be provided. When the clothes are put on the clothes hanger 10, the timing device is activated. After exceeding a set time period, the humidity sensor is activated to sense humidity information of the clothes. The timing device 80 may be mounted at the clothes hanger 10, or may be other places according to actual needs.

In one embodiment, the timing device 80 may be mounted at an upper arm 11 of the clothes hanger 10, and the upper arm 11 of the clothes hanger 10 is used to carry the clothes that are drying. In this way, when the clothes that are drying are put on the clothes hanger 10, the clothes that are drying are in contact with both of the upper arm 11 and the timing device 80 mounted at the upper arm 11. Then, the timing device 80 is automatically activated under the gravity of the clothes that are drying.

In actual implementation, the smart clothes drying device further includes a remote communication circuit 62. The prompter 60 may send a remote prompt message through the remote communication circuit. The remote communication circuit may send the remote prompt message to a portable device such as a mobile phone of the user in a wired or wireless transmission mode. The remote communication circuit may be set independently with the prompter or may be set in the prompter.

In actual implementation, as shown in FIG. 5, the smart clothes drying device may further include a first movement mechanism 90 and a storage box 30 disposed under the clothes hanger 10. The clothes hanger 10 is mounted to the first movement mechanism 90.

Figure 2:
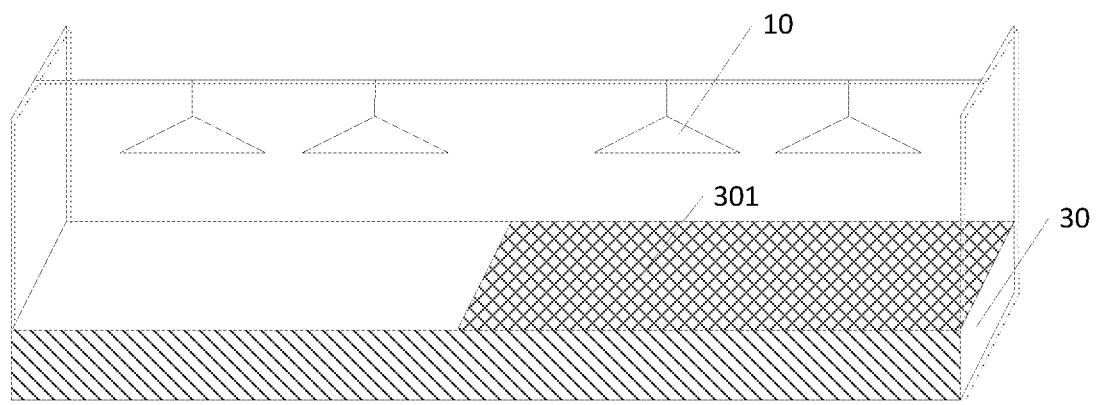
FIG. 2 is a schematic view of a storage box according to an embodiment of the present disclosure.

As shown in FIG. 2, an opening 31 is defined in a top portion of the storage box 30. A cover 301 is disposed at the opening 31.

When the humidity information reflected by the humidity signal output by each humidity sensor is less than the drying threshold, the integrated controller controls the cover 301 to be opened, and controls the first movement mechanism to drive the clothes hangers 10 to move downwards in turn. It should be noted that, here, the first movement mechanism drives the clothes hangers 10 to move downwards without changing positions of the humidity sensors. After the clothes hangers 10 enter into the opening 31, the integrated controller controls the first movement mechanism to drop the clothes hangers 10 so that both of the clothes hangers 10 and the clothes on the clothes hangers 10 are put together in the storage box 30. After the first movement mechanism drops all the clothes hangers 10, the integrated controller controls the cover 301 to be closed.

By using the integrated controller to determine whether the clothes are dry and placing the storage box 30 under the clothes hangers 10, whether the clothes are dried or not may be automatically determined and then the clothes may be automatically collected into the storage box 30 after the clothes are dried, thereby preventing the clothes that are drying from being dirty again due to dust accumulation when the user forgets to collect the clothes that are drying or the user goes out and cannot collect the clothes that are drying.

Further, the cover 301 of the storage box 30 is controlled by the integrated controller to open when the clothes are dries and then are to be put into the storage box 30, thereby preventing water from dropping in the storage box 30 when the clothes are drying. The cover 301 of the storage box 30 is controlled by the integrated controller to close after the clothes are collected into the storage box 30, thereby preventing the clothes that are drying from being dirty again due to dust accumulation in the storage box 30. It should be noted that, the clothes as well as the clothes hangers 10 are simultaneously put into the storage box 30 when the clothes are collected into the storage box 30, and then the first movement mechanism is restored.

In actual implementation, the integrated controller includes a memory, a data processing circuit, an umbrella control circuit, a prompter control circuit, a first movement mechanism controller circuit and a cover control circuit. The memory is used to store the closing light intensity threshold, the opening light intensity threshold and the drying threshold. The data processing circuit is used for comparison and judgment of the aforementioned information with corresponding thresholds. In one embodiment, the memory may adopt an integrated local storage device or an extended storage device such as a pluggable memory card. The data processing circuit, the umbrella control circuit, the prompter control circuit, the first movement mechanism controller circuit and the cover control circuit may be implemented as a processor.

In one embodiment, as shown in FIG. 5, the first movement mechanism 90 may include two spaced vertical supporters 92, a horizontal supporter 94, and a plurality of spaced vertical telescopic poles 96. The two vertical supporters 92 are disposed at two ends of the storage box 30. Two ends of the horizontal supporter 94 are in sliding connection with the two vertical supporters 92, respectively. The horizontal supporter 94 can move back and forth with respect to the two vertical supporters 92, (i.e., as shown in FIG. 5, the horizontal supporter 94 can move with respect to the two vertical supporters 92 in a direction perpendicular to the paper). An upper end of each vertical telescopic pole 96 is hung on the horizontal supporter 94. A lower end of each vertical telescopic pole 96 is used to mount the clothes hanger 10. When the vertical telescopic pole 96 is elongated in the vertical direction, the elongated vertical telescopic pole 96 drives the clothes hanger 10 to move downwardly towards the storage box 30. When the vertical telescopic pole 96 is contracted in the vertical direction, the contracted vertical telescopic pole 96 drives the clothes hanger 10 to move upwardly towards the horizontal supporter 94. The humidity sensor 70 may be hung on the horizontal supporter 94 through a rope 72. When used, the humidity sensor 70 drops naturally under the force of gravity and the humidity sensor 70, the clothes hanger 10 and the vertical telescopic pole 96 are substantially in an identical plane. Then, the humidity sensor 70 may be in contact with bottom portions of the clothes on the clothes hanger 10.

Figure 6:
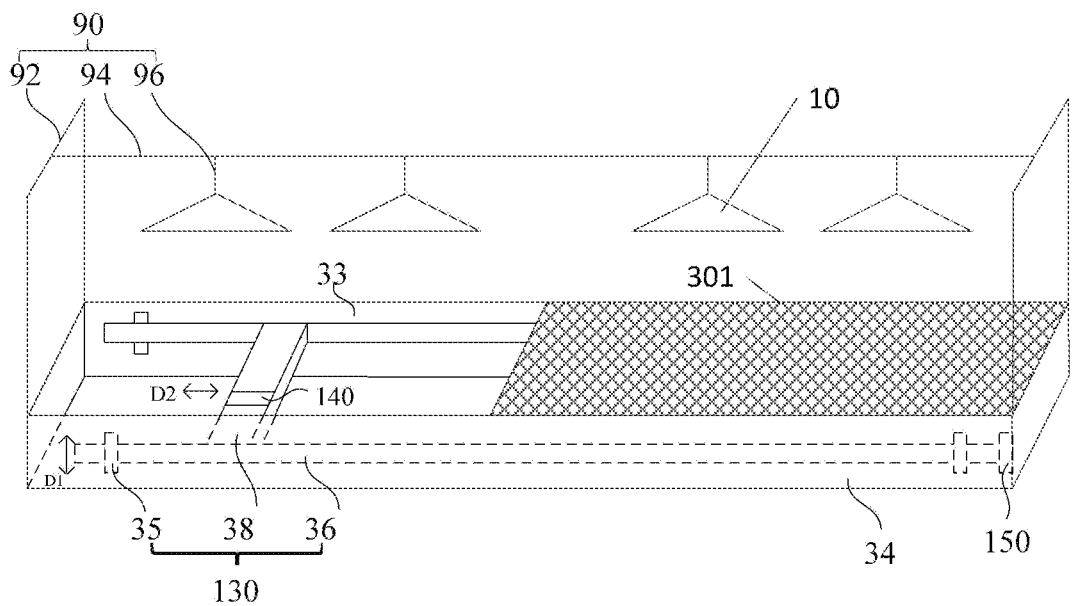
FIG. 6 is a schematic view of a storage box according to an embodiment of the present disclosure.

As an optional way for collecting the clothes neatly, on the basis of the first movement mechanism 90 and the storage box 30, as shown in FIG. 6, the smart clothes drying device further includes a second movement mechanism 130 in the storage box 30, a clamp 140 mounted to the second movement mechanism and a distance sensor 150. The second movement mechanism can move vertically and horizontally. The clamp and the distance sensor are at a bottom surface of the storage box 30.

The clothes hanger 10 is mounted to the first movement mechanism, i.e., hung on the first movement mechanism.

An opening 31 is defined in a top portion of the storage box 30. A cover 301 is disposed at the opening 31.

The distance sensor is used to detect a distance between two opposite inner walls of the storage box 30, and output a distance signal. For example, the second movement mechanism is located at the right side in the storage box 30 (which is the same as in the following examples in which the second movement mechanism located at the right side in the storage box 30), and then the distance sensor is used to detect a distance between a left inner wall and a right inner wall of the storage box 30.

When the humidity information reflected by the humidity signal output by each humidity sensor is less than the drying threshold, the integrated controller controls opening the cover 301 and controls the first movement mechanism to bring the clothes hangers 10 sequentially into the storage box 30 by means of controlling the vertical telescopic poles 96 to elongate sequentially. In this process, the integrated controller determines whether a distance sensed by the distance sensor is varied from a distance that is reflected by the initial distance signal and that is from the distance sensor to one side of the storage box 30 opposite to the distance sensor.

When the distance signal is varied (i.e., the bottom portions of the clothes on the clothes hangers 10 shield the distance sensor, so that the distance sensed by the distance sensor is changed from the distance between the left inner wall and the right inner wall of the storage box 30 to a distance between the clothes and he right inner wall of the storage box; at this point, it indicates that the bottom portions of the clothes on the clothes hangers 10 have dropped to the bottom of the storage box 30), the integrated controller controls the first movement mechanism to stop driving the clothes hangers 10 to move downwards (i.e., controlling the vertical telescopic poles 96 to stop elongating). Meanwhile, the integrated controller controls the second movement mechanism to move to an opposite one side of the storage box and controls the clamp to grip the clothes on the clothes hangers 10 (it should be noted that, at this point, the second movement mechanism drive only the clamp to move to the left side without changing the position of the distance sensor).

After the clamp grips the clothes on the clothes hanger 10, the integrated controller controls the first movement mechanism to continue driving the clothes hangers 10 to move downwards while controlling the second movement mechanism to drive the clamp to move backward (i.e., moving towards the right). When the clamp moves back to its initial position or the clothes hanger 10 enters into the opening, the integrated controller controls the first movement mechanism to drop the clothes hanger 10 and controls the clamp to drop the clothes on the clothes hanger 10. At this point, both of the clothes hanger 10 and the clothes on the clothes hanger 10 are put together in the storage box 30. Further, the clothes are placed smoothly, thereby avoiding wrinkles in the clothes when the clothes directly fall into the storage box 30.

After the clamp drops the clothes on the clothes hanger 10, the integrated controller controls the second movement mechanism to drive the clamp and the distance sensor move upwardly at the same time until the distance reflected by the distance signal is restored to the initial distance between the distance sensor and one side of the storage box 30 opposite to the distance sensor. The "bottom of the storage box 30" is gradually rising as the clothes are put in.

After the first movement mechanism drops all the clothes hangers 10, the integrated controller controls the cover 301 to be closed.

In the above mode in which the clothes are collected smoothly, a movement speed of the clothes hanger 10 when the integrated controller controls the first movement mechanism to continue driving the clothes hanger 10 to move downwards, is equal to a movement speed of the clamp when the integrated controller controls the second movement mechanism to drive the clamp to move backward. In this way, it can avoid pulling of clothes due to difference between the movement speed of the clothes hanger and the movement speed of the clamp, thereby avoiding damage to the clothes.

In the above optional mode in which the clothes are collected smoothly, the integrated controller includes a memory, a data processing circuit, an umbrella control circuit, a prompter control circuit, a first movement mechanism controller circuit, a second movement mechanism controller circuit, a clamp control circuit and a cover control circuit. The memory is used to store the closing light intensity threshold, the opening light intensity threshold and the drying threshold. The data processing circuit is used for comparison and judgment of the aforementioned information with corresponding thresholds. In one embodiment, the memory may adopt an integrated local storage device or an extended storage device such as a pluggable memory card. The data processing circuit, the umbrella control circuit, the prompter control circuit, the first movement mechanism controller circuit, the second movement mechanism controller circuit, the clamp control circuit and the cover control circuit may be implemented as a processor.

In one embodiment, as shown in FIG. 6, the second movement mechanism 130 includes two spaced vertical rails 35 on each of the first side 33 and the second side 34 of the storage box 30, a horizontal rail 36 on each of the first side 33 and the second side 34 of the storage box 30, and a sliding portion 38.

On each of the first side 33 and the second side 34 of the storage box 30, the horizontal rail 36 is slidably mounted on the two spaced vertical rails 35, and is capable of moving relative to the two spaced vertical rails 35 in a vertical direction (which is parallel to a direction D1 shown in FIG. 6). Two ends of the sliding portion 38 are slidably mounted at the horizontal rail 36 on each of the first side 33 and the second side 34 of the storage box 30, respectively. The sliding portion 38 is capable of moving along the horizontal rails 36 in a horizontal direction (which is parallel to a direction D2 shown in FIG. 6). The clamp 140 may be mounted on the sliding portion 38. The distance sensor may be mounted on the horizontal rail 36.

Figure 3:
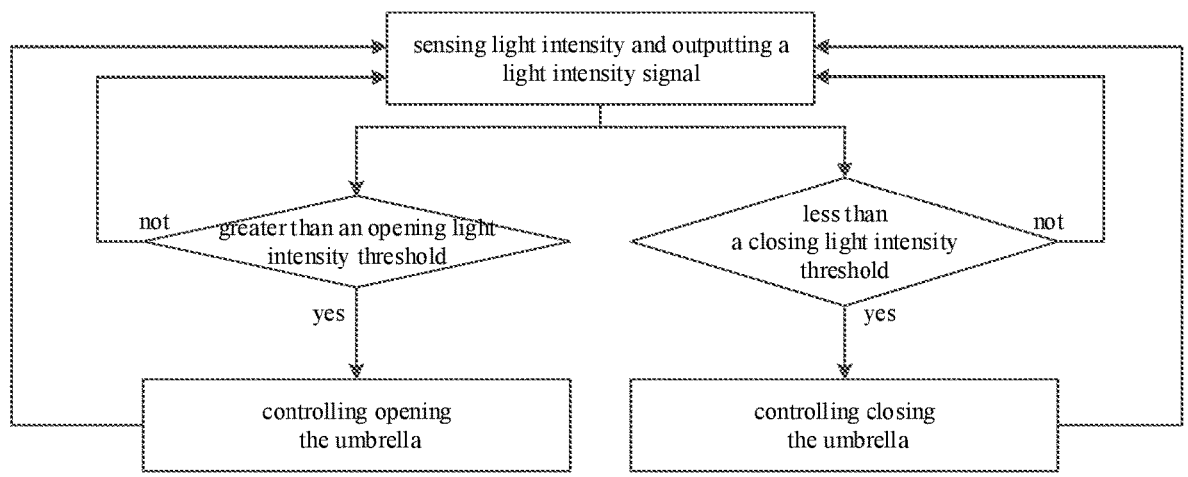
FIG. 3 is a flow chart of controlling an opening or closing state of an umbrella according to sensed light intensity in a smart clothes drying method according to an embodiment of the present disclosure.

One embodiment of the present disclosure further provides a smart clothes drying method based on the above mart clothes drying device. As shown in FIG. 3, the method includes:

using the light intensity sensor to sense light intensity and output a light intensity signal; where the light intensity sensor senses the light intensity of the natural environment, and the light intensity of the natural environment may represent light intensity of light irradiated to the clothes hanger and light intensity of light irradiated to clothes mounted on the clothes hanger;

using the integrated controller to control opening or closing of the umbrella according to a comparison result of comparing the light intensity signal with a closing light intensity threshold or an opening light intensity threshold; where the closing light intensity threshold and the opening light intensity threshold may be set according to experience and experiment;

controlling opening the umbrella when the light intensity signal is greater than the opening light intensity threshold, where when the light intensity signal is greater than the opening light intensity threshold, it indicates that the light intensity of sunlight is high; at this time, the umbrella is opened to shield clothes on all clothes hangers, thereby preventing the clothes from being damaged by strong sunlight;

controlling closing the umbrella when the light intensity signal is less than the closing light intensity threshold, where when the light intensity signal is less than the opening light intensity threshold, it indicates that the light intensity of sunlight is weak; at this time, sunlight does not damage the clothes on the clothes hangers, and the umbrella can be closed.

When the light intensity signal is greater than or equal to the closing light intensity threshold and less than the opening light intensity threshold, i.e., the light intensity signal is between the closing light intensity threshold and the opening light intensity threshold, it indicates that the light intensity of the sunlight is at a critical value, and the integrated controller does not adjust the opening or closing state of the umbrella.

In actual implementation, the method may further include:

using the rain-and-snow sensor to sense rain-and-snow information and output a rain-and-snow signal;

using the integrated controller to determine whether there is rain or snow according to the rain-and-snow information reflected by the rain-and-snow signal; when there is rain or snow, the integrated controller controls opening the umbrella; and when there is no rain or snow, the integrated controller controls closing the umbrella.

In this way, when preventing the clothes from being damaged by the strong sunlight, the smart clothes drying method can automatically open the umbrella when there is rain or snow, thereby preventing the clothes on the clothes hanger from getting wet.

Figure 4:
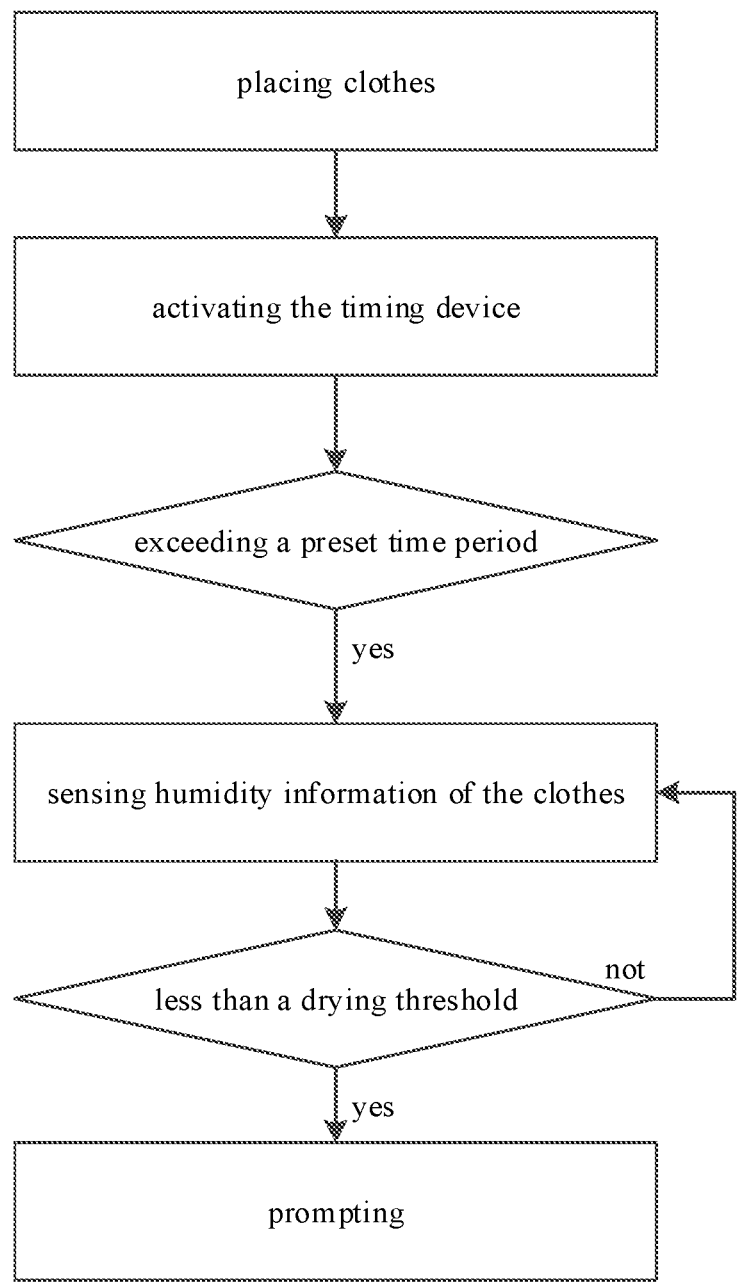
FIG. 4 is a flow chart of determining whether clothes are dried according to sensed humidity information of the clothes in a smart clothes drying method according to an embodiment of the present disclosure.

In actual implementation, as shown in FIG. 4, the method may further include:

enabling the humidity sensor to contact bottom portions of clothes on the clothes hanger;

using the humidity sensor to sense humidity information of the clothes and output a humidity signal;

using the integrated controller to compare the humidity information reflected by the humidity signal with a drying threshold; when the humidity information reflected by the humidity signal output by each humidity sensor is less than the drying threshold, controlling the prompter to send a prompt message; where the specific value of the drying threshold may be set according to experience and experiments.

In normal process of drying clothes, the bottom portions of the clothes are usually final drying portions, thus, the humidity sensor is provided at the bottom portions of the clothes and in contact with the clothes, so as to detect whether the clothes are dry. After the integrated controller determines that the clothes are dry, the integrated controller controls the prompter to send a prompt message for reminding the user to collect the clothes as soon as possible, thereby preventing the clothes that are drying from being dirty again due to dust accumulation when the user forgets to collect the clothes that are drying.

In actual implementation, in order to save power, calculate resources and extend working life of the humidity sensor and the integrated controller, a timing device may be provided. When the clothes are put on the clothes hanger, the timing device is activated. After exceeding a set time period, the humidity sensor is activated to sense humidity information of the clothes.

In actual implementation, in one embodiment, the method may further include:

installing the first movement mechanism and placing the storage box under the clothes hanger;

when the humidity information reflected by the humidity signal output by each humidity sensor is less than the drying threshold, using the integrated controller to control the cover to be opened and control the first movement mechanism to drive the clothes hangers to move downwards in turn (it should be noted that, here, the first movement mechanism drives the clothes hangers to move downwards without changing positions of the humidity sensors); after the clothes hangers enter into the opening, using the integrated controller to control the first movement mechanism to drop the clothes hangers; after the first movement mechanism drops all the clothes hangers, using the integrated controller to control the cover to be closed.

By using the integrated controller to determine whether the clothes are dry and placing the storage box under the clothes hangers, whether the clothes are dried or not may be automatically determined and then the clothes may be automatically collected into the storage box after the clothes are dried, thereby preventing the clothes that are drying from being dirty again due to dust accumulation when the user forgets to collect the clothes that are drying or the user goes out and cannot collect the clothes that are drying.

Further, the cover of the storage box is controlled by the integrated controller to open when the clothes are dries and then are to be put into the storage box, thereby preventing water from dropping in the storage box when the clothes are drying. The cover of the storage box is controlled by the integrated controller to close after the clothes are collected into the storage box, thereby preventing the clothes that are drying from being dirty again due to dust accumulation in the storage box. It should be noted that, the clothes as well as the clothes hangers are simultaneously put into the storage box when the clothes are collected into the storage box, and then the first movement mechanism is restored.

In actual implementation, in one embodiment, the method may further include:

installing the first movement mechanism with the clothes hanger being capable of being moving horizontally and vertically, placing the storage box under the clothes hanger, placing the second movement mechanism in one side of the storage box with the second movement mechanism being capable of being moving horizontally and vertically, mounting the clamp and the distance sensor on the second movement mechanism with the distance sensor proximate to the bottom of the storage box;

using the distance sensor to detect a distance between two opposite inner walls of the storage box and output a distance signal; for example, the second movement mechanism is located at the right side in the storage box 30 (which is the same as in the following examples in which the second movement mechanism located at the right side in the storage box 30), and then the distance sensor is used to detect a distance between a left inner wall and a right inner wall of the storage box 30;

when the humidity information reflected by the humidity signal output by each humidity sensor is less than the drying threshold, using the integrated controller to control opening the cover and control the first movement mechanism to drive the clothes hanger to move to a top of one side of the storage box opposite to the second movement mechanism and then move downward (for example, the second movement mechanism is at the right side of the storage box, then the first movement mechanism drives the clothes hanger to move to a top of the left side of the storage box and then drives the clothes hanger to move downward); meanwhile, using the integrated controller to determine whether the distance sensed by the distance sensor is varied from a distance that is reflected by the initial distance signal and that is from the distance sensor to one side of the storage box opposite to the distance sensor;

when the distance signal is varied (i.e., the bottom portions of the clothes on the clothes hanger 10 shield the distance sensor, so that the distance sensed by the distance sensor is changed from the distance between the left inner wall and the right inner wall of the storage box to a distance between the clothes and he right inner wall of the storage box), using the integrated controller to control the first movement mechanism to stop driving the clothes hanger to move downwards; meanwhile, using the integrated controller to control the second movement mechanism to move to an opposite one side of the storage box and control the clamp to grip the clothes on the clothes hanger (it should be noted that, at this point, the second movement mechanism drive only the clamp to move to the left side without changing the position of the distance sensor);

after the clamp grips the clothes on the clothes hanger, using the integrated controller to control the first movement mechanism to continue driving the clothes hanger to move downwards while controlling the second movement mechanism to drive the clamp to move backward (i.e., moving towards the right); when the clamp moves back to its initial position or the clothes hanger enters into the opening, using the integrated controller to control the first movement mechanism to drop the clothes hanger and control the clamp to drop the clothes on the clothes hanger; where, at this point, both of the clothes hanger and the clothes on the clothes hanger are put together in the storage box with the clothes being placed smoothly, thereby avoiding wrinkles in the clothes when the clothes directly fall into the storage box;

after the clamp drops the clothes on the clothes hanger, using the integrated controller to control the second movement mechanism to drive the clamp and the distance sensor to move upwardly at the same time until the distance reflected by the distance signal is restored to the initial distance between the distance sensor and one side of the storage box opposite to the distance sensor; where the "bottom of the storage box 30" is gradually rising as the clothes are put in;

after the first movement mechanism drops all the clothes hangers, using the integrated controller to control the cover to be closed.

In the above mode in which the clothes are collected smoothly, the movement speed of the clothes hanger when the integrated controller controls the first movement mechanism to continue driving the clothes hanger to move downwards, is equal to the movement speed of the clamp when the integrated controller controls the second movement mechanism to drive the clamp to move backward. In this way, it can avoid pulling of clothes due to difference between the movement speed of the clothes hanger and the movement speed of the clamp, thereby avoiding damage to the clothes.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A smart clothes drying device comprising:
a light intensity sensor;
an integrated controller;
an umbrella; and
at least one clothes hanger;
wherein the light intensity sensor is configured to sense light intensity and output a light intensity signal;
the integrated controller is configured to receive the light intensity signal and control opening or closing of the umbrella according to a comparison result of comparing the light intensity signal with a closing light intensity threshold or an opening light intensity threshold in such a manner that the integrated controller controls opening the umbrella when the light intensity signal is greater than the opening light intensity threshold, and the integrated controller controls closing the umbrella when the light intensity signal is less than the closing light intensity thresholds;
a prompter and a humidity sensor for contacting a bottom portion of clothes on the clothes hanger;
wherein the humidity sensor is configured to sense humidity information of the clothes and output a humidity signal;
the integrated controller is configured to receive the humidity signal, and compare the humidity information reflected by the humidity signal with a drying threshold; and control the prompter to send a prompt message when the humidity information reflected by the humidity signal output by the humidity sensor is less than the drying threshold.

2. The smart clothes drying device of claim 1, further comprising a rain-and-snow sensor;
wherein the rain-and-snow sensor is configured to sense rain-and-snow information and output a rain-and-snow signal;
the integrated controller is configured to receive the rain-and-snow signal, and determine whether there is rain or snow according to the rain-and-snow information reflected by the rain-and-snow signal;
the integrated controller is further configured to control opening the umbrella when there is rain or snow, and control closing the umbrella when there is no rain or snow.

3. The smart clothes drying device of claim 1, further comprising a remote communication circuit;
wherein the prompter is configured to send a remote prompt message through the remote communication circuit.

4. The smart clothes drying device of claim 1, further comprising a first movement mechanism and a storage box under the clothes hanger;
wherein the clothes hanger is mounted to the first movement mechanism; an opening is defined in a top portion of the storage box, and a cover is disposed at the opening;
wherein when the humidity information reflected by the humidity signal output by the humidity sensor is less than the drying threshold, the integrated controller is configured to,
control the cover to be opened and control the first movement mechanism to drive the clothes hanger to move downward;
control the first movement mechanism to drop the clothes hanger after the clothes hanger enters into the opening;
control the cover to be closed after the first movement mechanism drops each clothes hanger;
wherein the first movement mechanism includes two vertical supporters, a horizontal supporter, and a plurality of spaced vertical telescopic poles; the two vertical supporters are disposed at two ends of the storage box; two ends of the horizontal supporter are in sliding connection with the two vertical supporters, respectively; an upper end of each vertical telescopic pole is hung on the horizontal supporter; a lower end of each vertical telescopic pole is used to mount the clothes hanger; and the humidity sensor is hung on the horizontal supporter.

5. The smart clothes drying device of claim 4, wherein the humidity sensor is hung on the horizontal supporter through a rope.

6. The smart clothes drying device of claim 4, further comprising a second movement mechanism in the storage box, a clamp mounted to the second movement mechanism and a distance sensor;
wherein the clamp and the distance sensor are in the storage box;
the distance sensor is configured to detect a distance between one side of the storage box where the distance sensor is located and another side of the storage box opposite to the one side of the storage box where the distance sensor is located, and output a distance signal;
when the humidity information reflected by the humidity signal output by the humidity sensor is less than the drying threshold, the integrated controller is configured to control opening the cover and control the first movement mechanism to drive the clothes hanger to move to the another side of the storage box opposite to the one side of the storage box where the distance sensor is located, and then move downward; meanwhile, the integrated controller is configured to determine whether a distance sensed by the distance sensor is varied from an initial distance between the distance sensor and the another side of the storage box opposite to the one side of the storage box where the distance sensor is located;
when the distance sensed by the distance sensor is varied, the integrated controller is configured to control the first movement mechanism to stop driving the clothes hanger to move downwards; meanwhile, the integrated controller is configured to control the second movement mechanism to drive the clamp to move to the another side of the storage box opposite to the one side of the storage box where the distance sensor is located, and control the clamp to grip the clothes on the clothes hanger;
after the clamp grips the clothes on the clothes hanger, the integrated controller is configured to control the first movement mechanism to continue driving the clothes hanger to move downward while controlling the second movement mechanism to drive the clamp to move backward; when the clamp moves back to an initial position of the clamp or the clothes hanger enters into the opening, the integrated controller is configured to control the first movement mechanism to drop the clothes hanger and control the clamp to drop the clothes on the clothes hanger;
after the clamp drops the clothes on the clothes hanger, the integrated controller is configured to control the second movement mechanism to drive the clamp and the distance sensor to move upwardly at the same time until the distance reflected by the distance signal is restored to the initial distance between the distance sensor and the another side of the storage box opposite to the one side of the storage box where the distance sensor is located;
after the first movement mechanism drops the clothes hanger, the integrated controller is configured to control the cover to be closed;
wherein the second movement mechanism includes two spaced vertical rails on each of a first side and an opposite second side of the storage box, a horizontal rail on each of the first side and the second side, and a sliding portion;

on each of the first side and the second side, the horizontal rail is slidably mounted on the two spaced vertical rails, and is movable relative to the two spaced vertical rails in a vertical direction; two ends of the sliding portion are slidably mounted at the horizontal rail on each of the first side and the second side, respectively; the sliding portion is movable along the horizontal rails in a horizontal direction; the clamp is mounted on the sliding portion; and the distance sensor is mounted on the horizontal rail on one of the first side and the second side.

7. The smart clothes drying device of claim 6, wherein a movement speed of the clothes hanger when the integrated controller controls the first movement mechanism to continue driving the clothes hanger to move downward, is equal to a movement speed of the clamp when the integrated controller controls the second movement mechanism to drive the clamp to move backward.

8. The smart clothes drying device of claim 4, wherein the umbrella is mounted to the storage box.

9. The smart clothes drying device of claim 1, further comprising a timing device mounted to the clothes hanger.

10. The smart clothes drying device of claim 9, wherein the clothes hanger includes an upper arm for carrying the clothes, and the timing device is mounted at the upper arm.

11. A smart clothes drying method based on the smart clothes drying device of claim 1, comprising:
using the light intensity sensor to sense light intensity and output a light intensity signal;
using the integrated controller to control opening or closing of the umbrella according to a comparison result of comparing the light intensity signal with a closing light intensity threshold or an opening light intensity threshold in such a manner that the integrated controller controls opening the umbrella when the light intensity signal is greater than the opening light intensity threshold, and the integrated controller controls closing the umbrella when the light intensity signal is less than the closing light intensity threshold;
using the humidity sensor to sense humidity information of the clothes and output a humidity signal;
using the integrated controller to compare the humidity information reflected by the humidity signal with a drying threshold;
controlling the prompter to send a prompt message when the humidity information reflected by the humidity signal output by the humidity sensor is less than the drying threshold.

12. The method of claim 11, further comprising:
installing a first movement mechanism with the clothes hanger and placing a storage box under the clothes hanger;
using the integrated controller to control a cover of the storage box to be opened and control the first movement mechanism to drive the clothes hanger to move downward when the humidity information reflected by the humidity signal output by the humidity sensor is less than the drying threshold;
using the integrated controller to control the first movement mechanism to drop the clothes hanger after the clothes hanger enters into an opening of the storage box;
using the integrated controller to control the cover to be closed after the first movement mechanism drops the clothes hanger;
wherein the first movement mechanism includes two vertical supporters, a horizontal supporter, and a plurality of spaced vertical telescopic poles; the two vertical supporters are disposed at two ends of the storage box; two ends of the horizontal supporter are in sliding connection with the two vertical supporters, respectively; an upper end of each vertical telescopic pole is hung on the horizontal supporter; a lower end of each vertical telescopic pole is used to mount the clothes hanger; and the humidity sensor is hung on the horizontal supporter.

13. The method of claim 11, further comprising:
installing the first movement mechanism with the clothes hanger, placing a storage box under the clothes hanger, placing a second movement mechanism in one side of the storage box, and mounting a clamp and a distance sensor on the second movement mechanism with the clamp and the distance sensor within the storage box;
using the distance sensor to detect a distance between one side of the storage box where the distance sensor is located and another side of the storage box opposite to the one side of the storage box where the distance sensor is located, and output a distance signal;
when the humidity information reflected by the humidity signal output by the humidity sensor is less than the drying threshold, using the integrated controller to control opening the cover and control the first movement mechanism to drive the clothes hanger to move to the another side of the storage box opposite to the one side of the storage box where the distance sensor is located, and then move downward; and using the integrated controller to determine whether a distance sensed by the distance sensor is varied from an initial distance between the distance sensor and the another side of the storage box opposite to the one side of the storage box where the distance sensor is located;
when the distance sensed by the distance sensor is varied, using the integrated controller to control the first movement mechanism to stop driving the clothes hanger to move downwards; meanwhile, using the integrated controller to control the second movement mechanism to drive the clamp to move to the another side of the storage box opposite to the one side of the storage box where the distance sensor is located, and control the clamp to grip the clothes on the clothes hanger;
after the clamp grips the clothes on the clothes hanger, using the integrated controller to control the first movement mechanism to continue driving the clothes hanger to move downward while controlling the second movement mechanism to drive the clamp to move backward;
when the clamp moves back to an initial position of the clamp or the clothes hanger enters into the opening, using the integrated controller to control the first movement mechanism to drop the clothes hanger and control the clamp to drop the clothes on the clothes hanger;
after the clamp drops the clothes on the clothes hanger, using the integrated controller to control the second movement mechanism to drive the clamp and the distance sensor to move upwardly at the same time until the distance reflected by the distance signal is restored to the initial distance between the distance sensor and the another side of the storage box opposite to the one side of the storage box where the distance sensor is located;
after the first movement mechanism drops the clothes hanger, using the integrated controller to control the cover to be closed;
wherein the second movement mechanism includes two spaced vertical rails on each of a first side and an opposite second side of the storage box, a horizontal rail on each of the first side and the second side, and a sliding portion;

on each of the first side and the second side, the horizontal rail is slidably mounted on the two spaced vertical rails, and is movable relative to the two spaced vertical rails in a vertical direction; two ends of the sliding portion are slidably mounted at the horizontal rail on each of the first side and the second side, respectively; the sliding portion is movable along the horizontal rails in a horizontal direction; the clamp is mounted on the sliding portion; and the distance sensor is mounted on the horizontal rail on one of the first side and the second side.

\* \* \* \* \*